Figure 1:
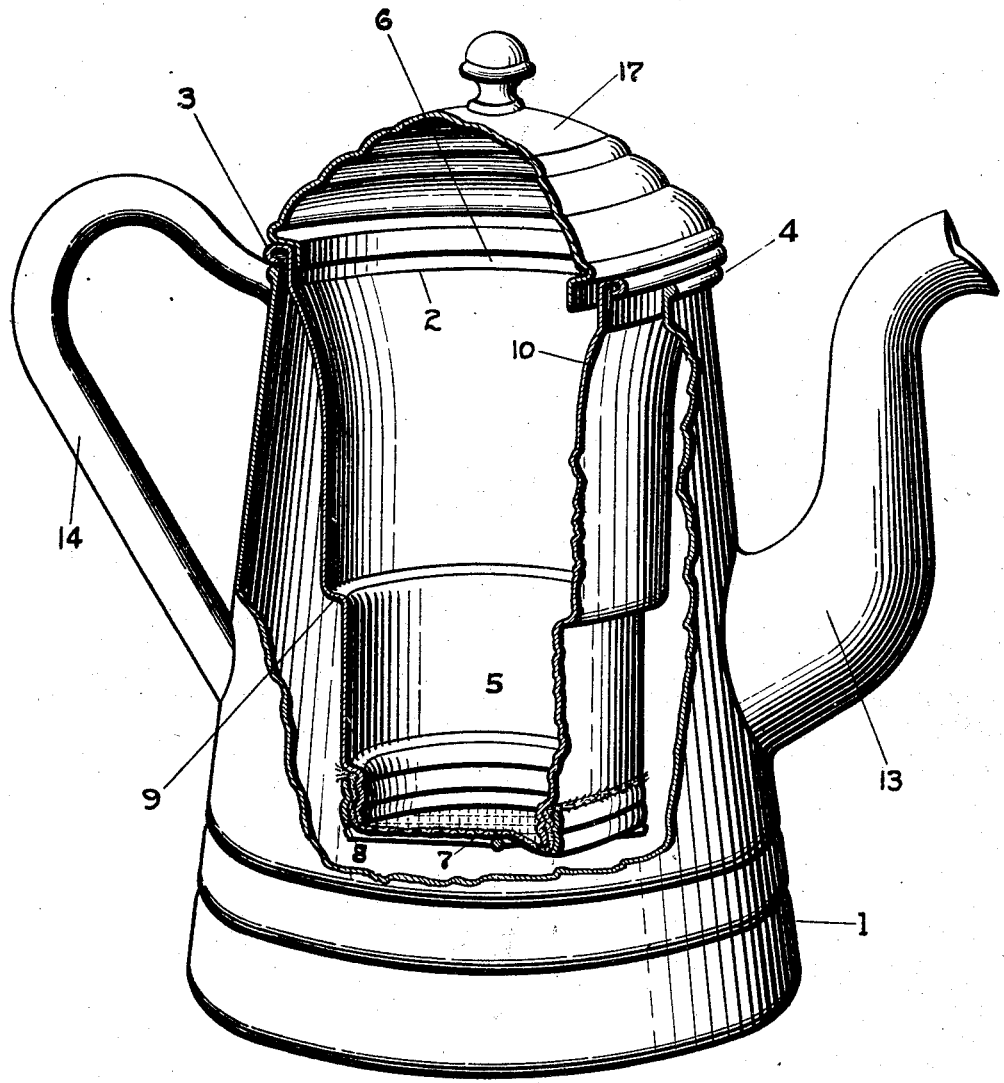

Aug. 11, 1925.

A. W. MEYER 1,549,043

COFFEE MAKING APPARATUS

Filed March 14, 1924    3 Sheets-Sheet 1

INVENTOR
ALBERT W. MEYER
BY Owen H. Spencer
HIS ATTORNEY

Aug. 11, 1925.

A. W. MEYER 1,549,043

COFFEE MAKING APPARATUS

Filed March 14, 1924  3 Sheets-Sheet 3

INVENTOR
ALBERT W. MEYER
BY Owen H. Spencer
HIS ATTORNEY

Patented Aug. 11, 1925.

1,549,043

UNITED STATES PATENT OFFICE.

ALBERT W. MEYER, OF INDIANAPOLIS, INDIANA.

COFFEE-MAKING APPARATUS.

Application filed March 14, 1924. Serial No. 699,247.

*To all whom it may concern:*

Be it known that I, ALBERT W. MEYER, a citizen of the United States, residing at Indianapolis, in the county of Marion and State of Indiana, have invented certain new and useful Improvements in Coffee-Making Apparatus, of which the following is a specification.

My invention relates to coffee making apparatus, and more particularly to coffee making apparatus having respective compartments for the liquid coffee and the grain coffee by which they may be kept somewhat separated; and consists substantially in the construction, combination and arrangement of parts hereinafter set forth and pointed out more particularly in the claims.

It is a primary object of my invention to provide a coffee making apparatus having a main liquid coffee vessel within which is supported a coffee grain compartment, said compartment having a porous or strainer means for communicating same with said vessel and adapted to be supported when desired above the liquid coffee for draining same from said grain coffee and thereby ending the coffee making process at will.

It is also a primary object of my invention to provide a coffee cooking vessel having an upwardly disposed lid opening, and a coffee grain compartment suspendable within such vessel in flanged relation to said opening, and a supporting means adapted to engage said container in shouldered relation, and at the same time engage said opening in flange relation, thus replacing said compartment, for supporting same in draining position as desired.

It is a further object of my invention to provide a coffee cooking vessel having an upwardly disposed opening, and a coffee grain compartment suspendable within said vessel in flange relation to said opening; a supporting means adapted to engage said compartment in shouldered relation, and at the same time engage said opening in flange relation thus replacing said compartment for supporting same in draining position when desired; and a lid means interchangeably receivable by said vessel and said compartment.

It is also an object of my invention to provide a coffee cooking vessel having a conventional lid opening; and upwardly flared grain coffee compartment suspendable within said vessel in flanged relation with said opening; a supporting collar disposable in flanged relation to said opening, adapted to engage said compartment and support same in a withdrawn position in respect to liquid coffee within said vessel; and a lid means adapted to engage said collar in shouldered relation and thus interchangeably replace said compartment in respect to said collar.

It is also an object of my invention to provide a coffee strainer having an upwardly flared mouth; a coffee cooking vessel adapted to inwardly suspend said strainer by engagement with the external surface of the flare of said mouth; a detachable strainer means adapted to communicate the interior of said strainer with said vessel when thus supported; and a spacer means interposable between said flare and said vessel for supporting said strainer in another position, said spacer means being adapted to replace said strainer on said vessel, and thus support same in a draining position.

Figure 2:
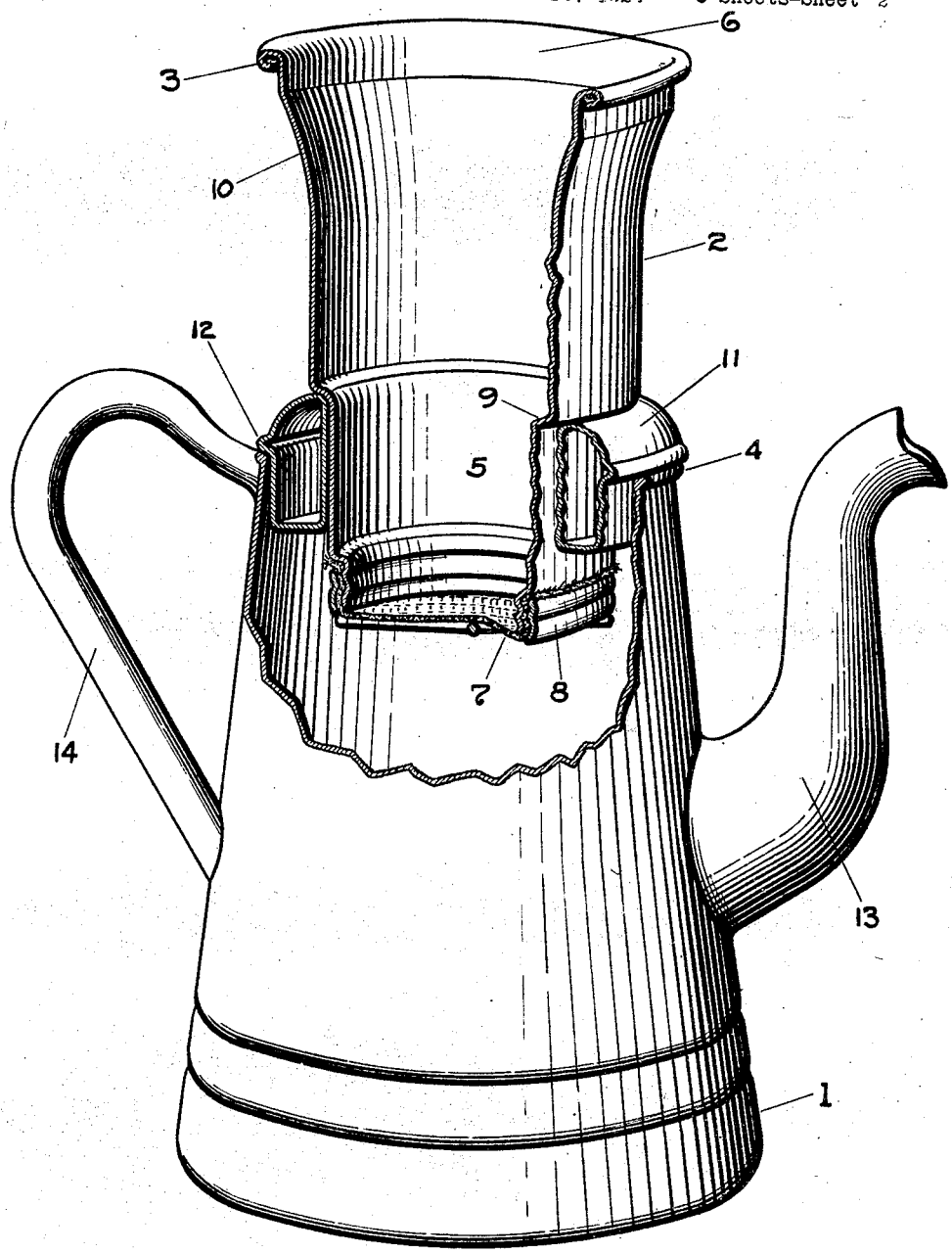
Figure 3:
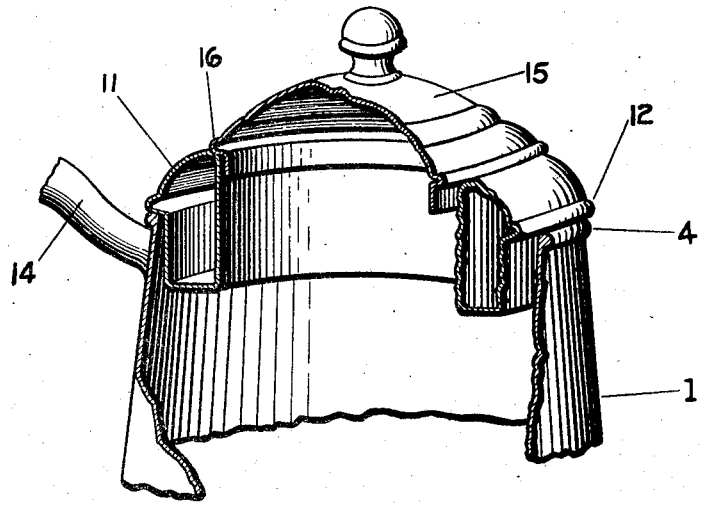
Figure 4:
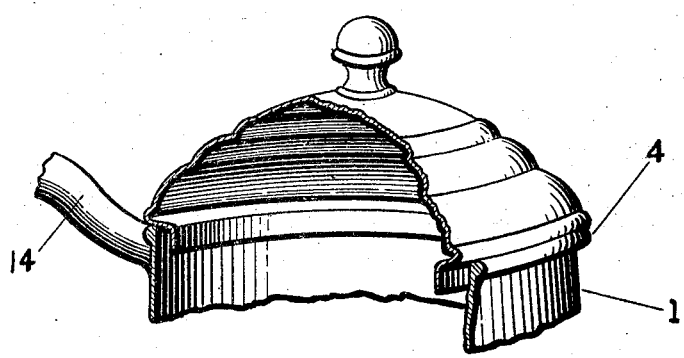
Figure 5:
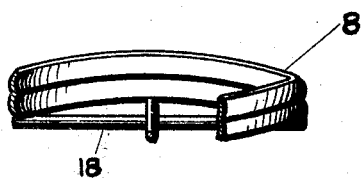

Fig. 1 is a fragmentary perspective view of my invention shown in coffee cooking arrangement; Fig. 2 is a fragmentary perspective view showing my invention in the draining arrangement; Fig. 3 is a detailed fragmentary perspective view showing one of the lids for the apparatus carried out by means of a conventionally constructed lid placed in shouldered engagement with the grain compartment supporting collar; Fig. 4 is a fragmentary detailed perspective view showing another lid for the apparatus serving as a conventional coffee pot lid in normal engagement with the liquid coffee containing vessel; and Fig. 5 is a detailed view of the strainer retaining ring.

Similar characters of reference designate similar parts thruout the several views. Referring to Fig. 1 the numeral 1 is the main liquid coffee vessel of my invention within which is suspended the coffee grain compartment 2, said compartment being supported by the flange 3 which laps over the edge 4 of said vessel in flanged relation thereto.

As before indicated Fig. 1 shows my invention in the coffee making arrangement, grain coffee being disposed within the barrel 5 of said compartment which forms the lower portion thereof.

In starting the coffee making operation, the compartment 2 is suspended within the vessel 1, grain coffee being supplied within the barrel 5, water, preferably boiling is then poured into the mouth 6 of said compartment. Said water runs thru said grain coffee and thence trickles into said vessel with a percolating effect by which the coffee making process is greatly expedited. The main cooking operation is now begun, the vessel 1 being placed over a flame or other heating means and the grain coffee being thus cooked within the barrel 5, communication being had between said grain and said water by means of the cloth bottom 7 which is secured to the barrel 5 by means of the female threaded ring 8, in drum head manner.

I have noticed in many instances that the coffee making process which necessarily extends until the liquid coffee is poured off or otherwise separated from the coffee grain, that such cooking process thus extends beyond the desired result or in other words, the liquid coffee last removed is usually over steeped, while the coffee first drawn may not be sufficiently steeped, and for this reason, in the ordinary process of coffee making, it is very difficult, if not impossible, to draw the coffee from the ordinary coffee making vessels at different intervals, and thus obtain a uniform grade of coffee.

I consider this to be a very useful feature of my invention, as it is customary to serve coffee directly from the coffee making vessel at different intervals in accordance with the different helpings of same.

With this and other facts in view, I have provided a shoulder 9 on the coffee compartment 2 at the junction of the barrel 5 and the flare 10 of said compartment, by which said compartment may be bodily supported upwardly, the grain coffee contained in the barrel 5 being thus withdrawn from the liquid coffee, said compartment being supported by said shoulder, which is adapted to downwardly embrace the spacing collar 11 as shown in Fig. 2. Said collar, when thus supporting said compartment, is adapted to replace same in reference to the edge 4 of the vessel 1 in flanged relation thereto, the flange 12 of said collar being adapted to engage the edge 4 interchangeable with the flange 3. By this supported arrangement of said compartment it is possible to bring the steeping process, before mentioned, to an end whenever the desired grade of coffee has been obtained, the coffee grain being thus separated from the liquid coffee and prevented from over cooking or steeping.

I consider it also to be a very useful feature of this arrangement that liquid coffee normally saturated in the coffee grain may be thus permitted to drain away from same, the cloth bottom 7 thus serving as a coffee strainer, by which arrangement a more complete separation of the liquid coffee from the grain coffee is possible, and therefore more of the liquid coffee is available to use than would be possible without such draining process.

I have provided a conventional pouring spout 13 on the vessel 1, thru which the liquid coffee may be poured, it being convenient to manually tilt said vessel by means of its handle 14 by which the apparatus as a whole may be lifted, tilted and carried about either when arranged for coffee cooking as shown in Fig. 1, or when arranged for draining as shown in Fig. 2.

Whenever it is desired to entirely remove the compartment 2 from the vessel 1, for cleaning or other purposes, preferably after the draining process is completed, the spacing collar 11 may be left on the vessel 1 and I have provided a conventionally constructed lid 15 which is adapted to replace said compartment in reference to said collar as shown in Fig. 3, the flange 16 of said lid being adapted to thus embrace said collar in the same manner as the shoulder 9 is adapted to embrace same.

Referring again to Fig. 1 the conventionally constructed coffee pot lid 17 is adapted to close the mouth 6 of the compartment 2, being engageable with same either in the coffee cooking arrangement or in the draining arrangement shown in Fig. 2. The advantage of lids for coffee making apparatus being understood by those familiar with the art, I do not deem it necessary to repeat such common and known facts. Referring to Fig. 4, said lid is shown in normal relation with the vessel 1, it being understood that said lid is adapted to interchangeably engage either the vessel 1 or the compartment 2, as desired.

It is understood that in the cooking operation water may be first supplied in the vessel 1 when the operator for any reason does not prefer pouring water thru the compartment 2, as above described.

The web 18 is secured to the ring 8, being adapted to span its female threaded opening and thus be disposed under the cloth bottom 7 to reinforce same and reduce the sagging tendency thereof. Said web also serves as a hand or finger hold for assembling or removing said ring from the barrel 5.

The collar 11 may be engaged with the mouth 6 of the compartment 2 in the same manner as said collar is engaged with the vessel 1 as shown in Fig. 2; and when the lid 15 is assembled with said collar as above described, said lid and said collar form together a suitable lid means for the compartment 2, as well as the vessel 1, preferably used in the draining arrangement of the apparatus as shown in Fig. 2.

While I have illustrated in a general way, certain instrumentalities which may be employed in carrying my invention into effect, it is evident that many modifications may be made in the various details, without departing from the scope of the appending claims, it being understood that my invention is not restricted to the particular forms herein described.

I claim as my invention:

1. A coffee making apparatus comprising a vessel for the liquid coffee having an upwardly disposed opening; an upwardly flared grain coffee compartment, the flared mouth of which overlaps and rests on the edge of said opening for suspending said compartment, in cooking position, within said vessel; a strainer cloth adapted to form a bottom for said compartment, the edges of said cloth embracing said compartment in drum head manner, said cloth serving to communicate said vessel with said compartment; a ring means adapted to surround the lower extremity of said compartment over said edges and thereby secure said cloth thereto; and a web means adapted to span the opening of said ring means for reinforcing said cloth.

2. A coffee making apparatus comprising a vessel for the liquid coffee having an upwardly disposed opening; an upwardly flared grain coffee compartment, the flared mouth of which overlaps and rests on the edge of said opening for suspending said compartment, in cooking position, within said vessel; a strainer cloth adapted to form a bottom for said compartment, the edges of said cloth embracing said compartment in drum head manner, said cloth serving to communicate said vessel with said compartment; a ring means adapted to surround said compartment over said edges and thereby secure said cloth thereto; a web means adapted to span the opening of said ring means for reinforcing said cloth; and a manually degageable supporting means interposed between said compartment and said vessel and adapted to thus support said compartment in another position for draining the liquid coffee from the grain coffee thru said cloth.

3. A coffee making apparatus comprising a vessel for the liquid coffee; a detachable compartment for the grain coffee adapted to be supported within said vessel; a detachable cloth strainer means adapted to communicate said compartment with said vessel; a ring means adapted to embrace the edges of said strainer means in drum head manner and secure same to said compartment; a web means adapted to span the opening of said ring means for reinforcing said strainer means, said web means serving also as a hand or finger hold for assembling or removing said ring means from said compartment; and a degageable supporting means interposable between said compartment and said vessel and adapted to thus support said compartment in a straining position whereby the liquid coffee may be drained from the grain coffee thru said strainer means.

4. A coffee making apparatus comprising a vessel for the liquid coffee having an upwardly disposed opening; an upwardly flared grain coffee compartment, the flared mouth of which overlaps and rests on the edge of said opening for suspending said compartment, in cooking position, within said vessel; a strainer cloth adapted to form a bottom for said compartment, the edges of said cloth embracing said compartment in drum head manner, said cloth serving to unite the contents of said vessel and said compartment during the cooking operation; a ring means adapted to surround the lower extremity of said compartment over said edges and thereby secure said cloth thereto; a web means adapted to span the opening of said ring means for reinforcing said cloth, said web means serving also as a hand-hold for assembling or removing said ring means from said compartment; and a manually degageable supporting means interposed between said compartment and said vessel and adapted to thus support said compartment in another position for draining the liquid coffee from the grain coffee thru said cloth.

5. A coffee making apparatus comprising a vessel for the liquid coffee having an upwardly disposed opening; an upwardly flared grain coffee compartment, the flared mouth of which overlaps and rests on the edge of said opening for suspending said compartment, in cooking position, within said vessel; a strainer cloth adapted to form a communicating bottom for said compartment, the edges of said cloth embracing said compartment in drum head manner; a ring means adapted to encircle said compartment over said edges and thereby secure said cloth thereto; a web means adapted to span the opening of said ring means for reinforcing said cloth, said web means serving also as a hand-hold for assembling or removing said ring means from said compartment; a manually degageable supporting means interposed between said compartment and said vessel and adapted to thus support said compartment in another position for draining the liquid coffee from the grain coffee thru said cloth, said supporting means being adapted to fit both the mouth of said vessel and the mouth of said compartment; and a lid means adapted to displace said compartment in said supporting means and form with said supporting means a lid receivable by both said vessel and said compartment.

In testimony whereof, I have hereunto set my hand on this the 10th day of March, 1924, A. D.

ALBERT W. MEYER.

Witnesses:
 OWEN H. SPENCER,
 WILLIAM WILGUS.